Oct. 12, 1954     L. N. ALLEN, JR     2,691,570
MANGANESE CONCENTRATION PROCESS
Filed Feb. 15, 1952
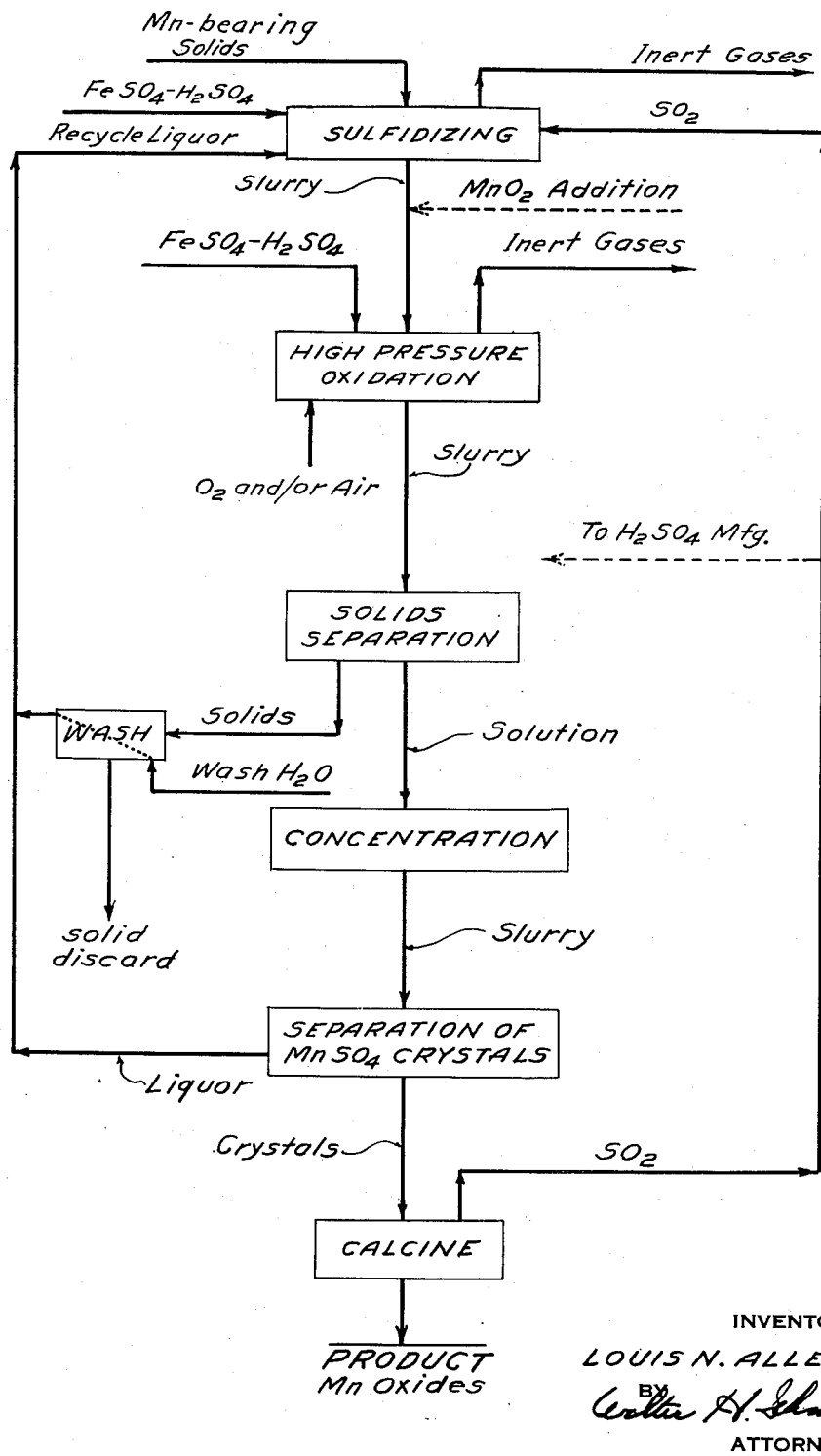
INVENTOR
LOUIS N. ALLEN, JR.
BY
ATTORNEY Patented Oct. 12, 1954

2,691,570

UNITED STATES PATENT OFFICE 2,691,570

MANGANESE CONCENTRATION PROCESS

Louis N. Allen, Jr., Short Hills, N. J., assignor to Chemical Construction Corporation, New York, N. Y., a corporation of Delaware Application February 15, 1952, Serial No. 271,676

4 Claims. (Cl. 23—117)

The present invention relates to the production of ferro-grade manganese. More specifically, it is concerned with hydrometallurgical processes in which manganese content of natural and/or synthetic manganese-bearing solids is dissolved and subsequently recovered from solution as a higher grade concentrate and/or as a concentrate in a more useful form. As such, the present invention deals with a novel combination of steps involving solutions operations and manganese recovery.

This application is a continuation-in-part of my copending application for United States Letters Patent Serial No. 215,217 filed March 13, 1951.

Of late years, manganese has come to assume an increasing industrial importance. Modern steels, for example, could not be manufactured by known methods except at greatly increased costs without manganese. Although large reserves of low-grade manganese ore are fairly common, very few such deposits are suitable for mechanical beneficiation. These latter are relatively small in size and widely scattered. As a result, high-grade manganese concentrates, whether natural or mechanically beneficiated, are not always adequate to supply the demand at all times and in all localities.

As a result, a great deal of work has been done in the attempted development of a suitable hydrometallurgical process for increasing the grade of readily-available low-grade ores. In the past, many proposals have been investigated. These have included both manganese-dissolving and manganese-precipitating steps.

Proposals for dissolving operations have included a wide variety of suggestions. Among these are included the utilization of ammonium and ferrous sulfates; sulfuric and nitric acids; nitrogen peroxide and sulfur dioxide. Unfortunately, all of these processes suffer from inherent deficiencies which have prevented their useful development.

For example, the ammonium sulfate process suffers from the serious problems involved in the necessary recirculation of weak solutions and the removal of magnesium therefrom. Nitric acid and nitrogen peroxide methods are subject to relatively high reagent costs. This makes it necessary to carefully wash all residues and either to sell as by-products or transform back to nitric acid all non-manganese nitrates. Virtually, this means all other cations are present in the ore, since all nitrates are soluble in water. Furthermore, the technical problems connected with the decomposition have never been solved satisfactorily.

Use of ferrous sulfate as a leaching agent aggravates the already existing difficulty of removing sufficient iron to leave a product manganese concentrate with an iron content below the maximum permissible for ferro-grade manganese. Transformation of ferrous sulfate to manganese sulfate is so incomplete that additional steps have to be taken to remove iron down to an acceptable content. Sulfuric acid leaching is, in many instances, completely ineffective. Most natural occurring manganese bearing solids have manganiferous compositions which are, for the most part, insoluble in sulfuric acid.

Only one, the sulfur dioxide process, has shown sufficient promise to be investigated on an industrial scale. Although most promising, the sulfur dioxide process failed to operate on a continuous cyclic process. Liquor resulting from a sulfur dioxide leach is contaminated with sulfur compounds, other than sulfates, such as dithionates and the like. Presence of such compounds appears to cause the liquor to be quite viscous, affecting subsequent separation operations. Removal of iron and other solid impurities as well as subsequent separation of manganese sulfate crystals is therefore extremely difficult. High concentrations of such compounds, moreover, cause formation of sulfur dioxide during evaporation with resulting corrosion of evaporator equipment and irrecoverable loss of sulfur. Dithionate salts also cause difficulties during roasting since the decomposition thereof occurs before sulfates. As a result, the decomposed salts fuse with the manganese sulfate crystals creating internal buildups in the calcine. The described difficulties caused numerous shutdowns leading eventually to abandonment of industrial scale operations.

None of the proposed hydrometallurgical procedures were wholly satisfactory. None combined both effective solutions operations with useful metal recovery processing operable on a continuous cyclic basis. Manganese recovery in any proposed hydrometallurgical process has never exceeded more than about 90%. There has continued to exist, therefore, a demand for a process, capable of producing ferro-grade manganese, which is both economically feasible and free of technical difficulties.

More recently, there has been disclosed in my copending application for United States Letters Patent, Serial No. 215,217, filed March 13, 1951 a hydrometallurgical process for producing ferro-grade manganese which fills the above defined demand. Broadly, as shown therein, this process comprises treating a slurry of manganese-bearing solids with sulfur dioxide in definite amounts; pressure oxidizing the resultant slurry; collecting the oxidized solution and recovering therefrom the manganese in the form of a sulfate. The sulfate is then sintered to produce manganese oxides and sulfur dioxide, the latter being recycled to the leaching step.

Difficulties encountered in previous attempts at treating manganese-bearing solids with sulfur dioxide are largely overcome by this novel organization of steps.

Surprisingly, it has now been discovered, according to this invention, that a ferrous sulfate-sulfuric acid solution is an ideal source of sulfur for dissolving manganese content as sulfates when employed in combination with pressurized oxidation. Even more surprising is the effectiveness of the combination, particularly in view of the known inability of sulfuric acid to dissolve most natural manganese bearing solids and the disadvantages previously associated with attempted uses of ferrous sulfate as a leaching agent.

In general, the present process comprises adding a sufficient quantity of ferrous sulfate-sulfuric acid solution to an aqueous slurry of finely ground manganese-bearing solids and subjecting the resultant slurry to oxidation at an elevated temperature and pressure. After oxidation, the solution is collected, concentrated, and the manganese content separated therefrom as a sulfate. Recovery of manganese is by sintering to produce oxides. Evolved sulfur dioxide is recovered and recycled to serve as a source of sulfur for further leaching.

A detailed description of the process may be more easily followed by reference to the accompanying drawing. This drawing constitutes a flow diagram illustrating the sequence of the operational steps. The following description of the process will be in conjunction with this flow diagram.

Practically any type of manganese bearing solids may be treated by the process of this invention. Silicates, carbonates and oxides, the latter often in the form of dioxides, as well as combinations thereof, may be easily and effectively handled. Low grade natural ores of 10–20% manganese content, of which there is an abundance, can be processed, as can the less available higher grade ores.

Various industrial sources may also provide manganese-bearing solids adaptable for treatment in the present process. For instance, manganese silicate slag may be obtained by treating high manganese basic iron so as to oxidize most of the manganese and silicon. The resulting slag may contain up to 40% or more manganese as silicates which may then be converted to more useful form by treatment in the instant process.

When an ore is the source of manganese feed, if desirable or necessary, it may be treated as a whole ore. However, since most ores undergo a certain amount of preliminary treatment, it usually will be a concentrate. The nature and extent of the preliminary treatment will depend on the ore, which, as noted above, may vary widely in the nature and content of the manganese minerals and in physical characteristics. In general, at least the practicable maximum of worthless gangue will have been eliminated. Treatment may be by washing, gravity separation, froth flotation and the like, all of which are known fields and form no part of the present process.

It is desirable that the ore be reduced to fine particles, both to unlock the desired mineral values and to facilitate subsequent leaching. It is usually sufficient to grind the ore to pass about a 65 mesh screen. However, fineness of grinding must be selected by an economic balance. The increased cost of grinding the whole product to finer sizes must be balanced against potential gain in product yield as a result. Grinding to about minus 85 mesh will usually be about the limit beyond which there is no commensurate gain for increased expense. Similarly, other manganese-containing material, such as the slag described above, must be pulverized for the same reasons and to a degree governed by the same considerations.

Following size reduction, an aqueous slurry is made of the ground manganese feed. The ferrous sulfate-sulfuric acid liquor may be used for slurrying or added later as desired. Liquor addition is designated as a sulfidizing step in the flow diagram. By sulfidizing, as used throughout the specification and claims, is meant the addition of sulfur equivalents for sulfating any dissolved metal values of the feed. As described later, however, other effects may be obtained by the use of a ferrous sulfate-sulfuric acid solution.

Although such a solution may be specifically prepared, one advantage in using such solutions for sulfidizing is their availability as by-products from other industries. For instance, such solutions are available in the form of spent pickle liquor employed in cleaning iron or steel. Such liquors usually comprise impure aqueous solutions containing some 10–20% ferrous sulfate and about 5–20% of sulfuric acid. Other byproduct solutions of similar composition are likewise available as, for example, end liquors from the manufacture of titanium dioxide and the like.

The amount of ferrous sulfate-sulfuric acid solution to be added is difficult to define by numerical limits inasmuch as it will vary according to the composition of manganese feed as well as the composition of the solution. However, at least sufficient ferrous sulfate should be available therein to reduce any of the four valent manganese present, particularly as oxides in natural ores, to a more readily dissolved divalent form as manganous sulfate. In addition, there should be at least sufficient sulfur present to dissolve all the manganese as sulfates. Further, there must also be sufficient sulfur to form sulfates of any amounts of other elements which may dissolve during sulfidizing and subsequent oxidation which will be discussed next. In addition to the sulfur requirements defined, it is very desirable that surfuric acid be present in excess of that required to form sulfates of the dissolved elements. This will drive the reaction, increasing the rate of extraction and the recovery of manganese content. Free acid remaining after oxidation, however, should not be excessive for reasons which will be subsequently discussed. The sulfur requirement can be stoichiometrically determined and the necessary adjustments in amount of solution used determined thereby.

After addition of ferrous sulfate-sulfuric acid solution, the resulting slurry is passed to the second main step of the overall process, shown on the flow diagram as pressure oxidation. Pressure oxidation is conducted by agitating and aerating the slurry in a pressure vessel. Oxygen is preferred for the purpose but air or oxygen-enriched air may be substituted therefor.

Preferably, but not necessarily, oxidation should be carried out continuously by introducing slurry under pressure to the vessel, and withdrawing therefrom at rates which will maintain a constant volume in process. Suitable equipment might take any form such a series of vessels overflowing into each other or a single long horizontal vessel consisting of a number of compartments. Circulation of gas should be maintained to promote uniformity of temperature.

Oxidation should preferably be carried out at a temperature of about 300 degrees F. to about 500 degrees F. Below about 300 degrees–350 degrees F. the desired effects, if obtained at all, are obtained at such a slow rate as to be of no practical value. On the other hand, although reaction rates increase with temperature increases, above about 500 degrees F. the rate of corrosion on the metallic parts soon becomes excessive. Moreover, pressures at least equivalent to the temperature must be maintained. Excessive temperatures, therefore, place unnecessarily strict limitations both on the pressure capabilities of the apparatus used and on the cost of compressing the oxidizing gas. Any advantage in rate which might be gained by use of excessive temperatures and pressures is, therefore, not economically justified. Where air, or oxygen-enriched air, is used, inert gases are vented off as shown in the drawing.

Pressurized oxidation in conjunction with the other steps of the process is a novel feature of this invention. First, by increasing the temperature to within the range indicated, it is possible to recover that small percentage of manganese minerals which otherwise would not be dissolved. Recovery of manganese content can, therefore, be increased over that of conventional methods, which generally does not exceed 90%.

Secondly, iron removal to acceptable standards, which made previous processes employing a leaching agent containing iron impracticable, is easily accomplished without resort to additional steps. Bivalent iron, as it exists in the liquor, is oxidized under the above described conditions of temperature and pressure to the much less soluble ferric form. Moreover, at the oxidizing temperature, the solubility of ferric iron is much less than at room temperatures. Under the prescribed conditions of oxidation, therefore, it is possible to precipitate ferric iron from solution in various forms.

Previously, it was stated that a slight excess of sulfuric acid was desirable to drive the reaction. However, since iron solubility is roughly proportional to acid concentration, the excess of acid remaining after complete leaching should be limited. Preferably, it should be limited to less than 5% since below this concentration ferric iron will precipitate as the hydroxide rather than as a basic ferric sulfate. In this way a cyclic sulfur loss is avoided since sulfur of the basic sulfate is irrecoverable. At the same time, maintaining the excess acid below the limit prescribed, insures the iron to manganese ratio in the sulfate solution being within the prescribed standard for ferro-grade manganese.

From the oxidation operation during which leaching is completed, slurry is sent to a solids-separation step. This may take any desired mechanical form. The solids to be separated may include barium and calcium sulfate, basic magnesium sulfate, basic ferric sulfate, ferric hydroxide and oxide as well as the original insoluble residue of the manganese feed. Because of the physical condition in which barium and calcium sulfates are formed, this can be done by decantation, the insolubles being readily settled. If so desired, filtration may be employed. The choice of methods will be based on economic considerations. If so desired, other mechanically equivalent operations, such as centrifugal separation, may be used. Due to the acid content of the slurry, the simpler the apparatus used, the better, in order to avoid corrosion problems. After washing, the solids are discarded and the wash water is recycled, thus recovering sulfuric acid and avoiding excessive sulfur losses.

The resultant filtrate or decanted liquor will contain manganese sulfate. This may be recovered in any desired manner. However, the following described procedure is both economical and simple.

On leaving the solids-separation step, clarified liquor is subjected to concentration. Preferably this is done by introduction of hot gases from any suitable source directly into the liquor. Concentration should be carried to the stage where the sulfuric acid content is equivalent to about 40–75% acid. About 60% is a good average practice. If so desired, these limits may be exceeded. However, within these limits, the crystals formed are more easily filterable. Further, a submerged burner evaporator, if used, works best in this range. After concentration, the principal manganese content of the solution has crystallized as manganese sulfate crystals, usually the monohydrate.

After concentration, the resultant crystal slurry is treated to separate and collect the manganese sulfate crystals. In actual operation, any suitable method may be used. These may include decanting, screening, centrifuging, filtering, or other mechanical equivalents in conjunction with a conventional washing by any desired manner. Separated liquor and washings are also recycled to conserve the sulfur.

As shown in the drawing, collected crystals are passed to an operation designated as calcining. This may be accomplished in any suitable manner, as by mixing with coke and firing. By suitable care, the off gases may be made to contain some 7–8% sulfur dioxide. The product of the calcining operation will be manganese oxides, usually mixed. Ordinarily, they will comprise a composition indicating an average oxidation state which may be represented as $Mn_2O_3$.

An outstanding feature of the present process is recovery of sulfur, in various forms, for recycle and reuse in extraction. As noted above, sulfur losses are in part avoided by recycle of the liquor and wash water from the second solids separation. These may be used for slurrying manganese-bearing feed material.

Sulfur is also recovered in the form of sulfur dioxide produced as a decomposition product during the calcining of manganese sulfate. By suitable care the off gases from calcining may be made to some 7–8% which sulfur dioxide can be recycled and employed in a manner to be described.

Where available ferrous sulfate-sulfuric acid solutions in the form of waste industrial liquors are limited in amount, recovered sulfur dioxide may be recycled to the sulfidizing step where it may act, in conjunction with any available ferrous sulfate, to complete the manganic-manganous reduction. If the total recycled sulfur dioxide is more than that required to complete the manganic reduction, the remainder may serve as a sulfur source, along with the ferrous sulfate and sulfuric acid of the liquor, for dissolving manganese and small amounts of other metals as sulfates during oxidation.

It should also be noted that the flow diagram indicates that ferrous sulfate-sulfuric acid liquor may be introduced either in sulfidizing or in oxidation. It is preferable to introduce ferrous sulfate-sulfuric acid solution into the sulfidizing step in sufficient amount so as to provide at least enough ferrous sulfate which, along with any recycled sulfur dioxide, will substantially complete manganic reduction. Remaining sulfur equivalents may be introduced into sulfidizing or oxidation or both in the form of ferrous sulfate-sulfuric acid liquor and as recycled sulfur compounds as described above.

A further alternative shown on the flow diagram is conversion of all sulfur dioxide, beyond that amount which may be required for manganic reduction, to sulfuric acid in a separate unit which forms no part of this invention. Such practice will generally be more economical than conversion of sulfur dioxide to sulfate during high pressure oxidation. The sulfuric acid may then be employed as a sulfur source to the extent required and may be introduced either into the sulfidizing or oxidation operations, or both.

The use of sulfur dioxide, recovered from roasting, for reducing tetravalent manganese would appear to be subject to the same objections as in the previously discussed sulfur dioxide process. An outstanding feature of this invention, however, lies in the fact that the difficulties of the sulfur dioxide process can be avoided by pressurized oxidation. Evaporating, separating and roasting problems created by the presence of dithionates and the like are substantially overcome by pressurized oxidation of these compounds to sulfates and sulfuric acid. Conversion of these compounds eliminates the viscous solution so troublesome to separating and avoids internal buildups in calcining equipment. Just as important is the elimination of substantial sulfur losses as sulfur dioxide during evaporation. At the same time, excessive corrosion of evaporator equipment caused by sulfur dioxide release is eliminated.

As was noted, some excess sulfuric acid is desirable, but it should preferably be maintained below about 5% by weight. Where sulfur dioxide is used in whole or in part for manganic-manganous reduction, much free acid is produced by subsequent oxidation of thionates formed during sulfur dioxide absorption. Production of sulfuric acid by oxidation of these and similar compounds may be reduced to the desired extent by an optional step indicated in dotted lines on the drawing as "MnO₂ addition."

This ordinarily depends on the availability of a good grade of pyrolusite. MnO₂ may be recycled for the purpose, but it will seldom be economical to do so. However, if a good grade of MnO₂ concentrate is available, the slurry from the sulfidizing operation may be treated therewith. The MnO₂ will react therewith to produce additional dissolved manganese sulfate.

This may be used to raise the content of dissolved manganese in the slurry some 20-40%. In some cases, it may be even higher. Thus, in addition to aiding control over excess acid production and sulfur loss, this improves the overall economy. It provides a more concentrated manganese sulfate and thereby decreases concentrating costs.

I claim:

1. In the hydrometallurgical concentration of the manganese content of manganese bearing solids in which an aqueous slurry of said solids is treated with a leaching agent comprising at least one member selected from the group consisting of sulfur dioxide and ferrous sulfate whereby a slurry comprising soluble manganese sulfate and dithionates is formed and said slurry is treated to recover a solid product comprising manganese sulfate, the improvement in combination therewith which comprises subjecting said slurry at a temperature greater than about 300° F. and a pressure at least sufficient to maintain the liquid phase to the action of at least one member selected from the group consisting of oxygen, oxygen enriched air and air whereby substantially all the dithionate content of said slurry is oxidized to sulfates and sulfuric acid.

2. A hydrometallurgical process for concentration of the manganese content of manganese bearing solids which comprises treating an aqueous slurry of said solid with a leaching agent comprising at least one reducing agent selected from the group consisting of sulfur dioxide and ferrous sulfate, the amount of leaching agent being at least sufficient to reduce any tetravalent manganese to the divalent form and provide chemical equivalents of sulfur to form sulfates of the dissolved manganese content of said solids and any other mineral values concomitantly dissolved, treating resultant slurry at a temperature greater than about 300° F. and a pressure at least sufficient to maintain the liquid phase to the action of at least one member selected from the group consisting of oxygen, oxygen enriched air and air for a time at least sufficient to oxidize substantially all the oxidizable sulfur content of said slurry to sulfates and sulfuric acid and the oxidizable iron content to ferric iron, pressure relieving and cooling the oxidized slurry, removing the solids and treating resultant solution to recover the manganese content thereof.

3. A process according to claim 2 in which the amount of leaching agent is such as to provide chemical equivalents of sulfur to form a free sulfuric acid concentration in said slurry after oxidation, not substantially greater than about 5%.

4. A process according to claim 2 in which after solids are separated resultant solution is concentrated to provide a sulfuric acid content equivalent to about 40-75% acid.

References Cited in the file of this patent

UNITED STATES PATENTS

| Number | Name | Date |
|---|---|---|
| 1,304,222 | Van Arsdale | May 20, 1919 |
| 1,325,129 | Westling | Dec. 16, 1919 |
| 1,348,068 | Van Arsdale | July 27, 1920 |
| 1,770,791 | Libby | July 15, 1930 |
| 2,176,774 | Sweet | Oct. 17, 1939 |
| 2,397,824 | Wanamaker | Apr. 2, 1946 |

OTHER REFERENCES

Liddell, "Handbook of Non-Ferrous Metallurgy," vol. 2, Recovery of the Metals, McGraw-Hill Book Co., N. Y. 1945, page 575.